Figure 1:
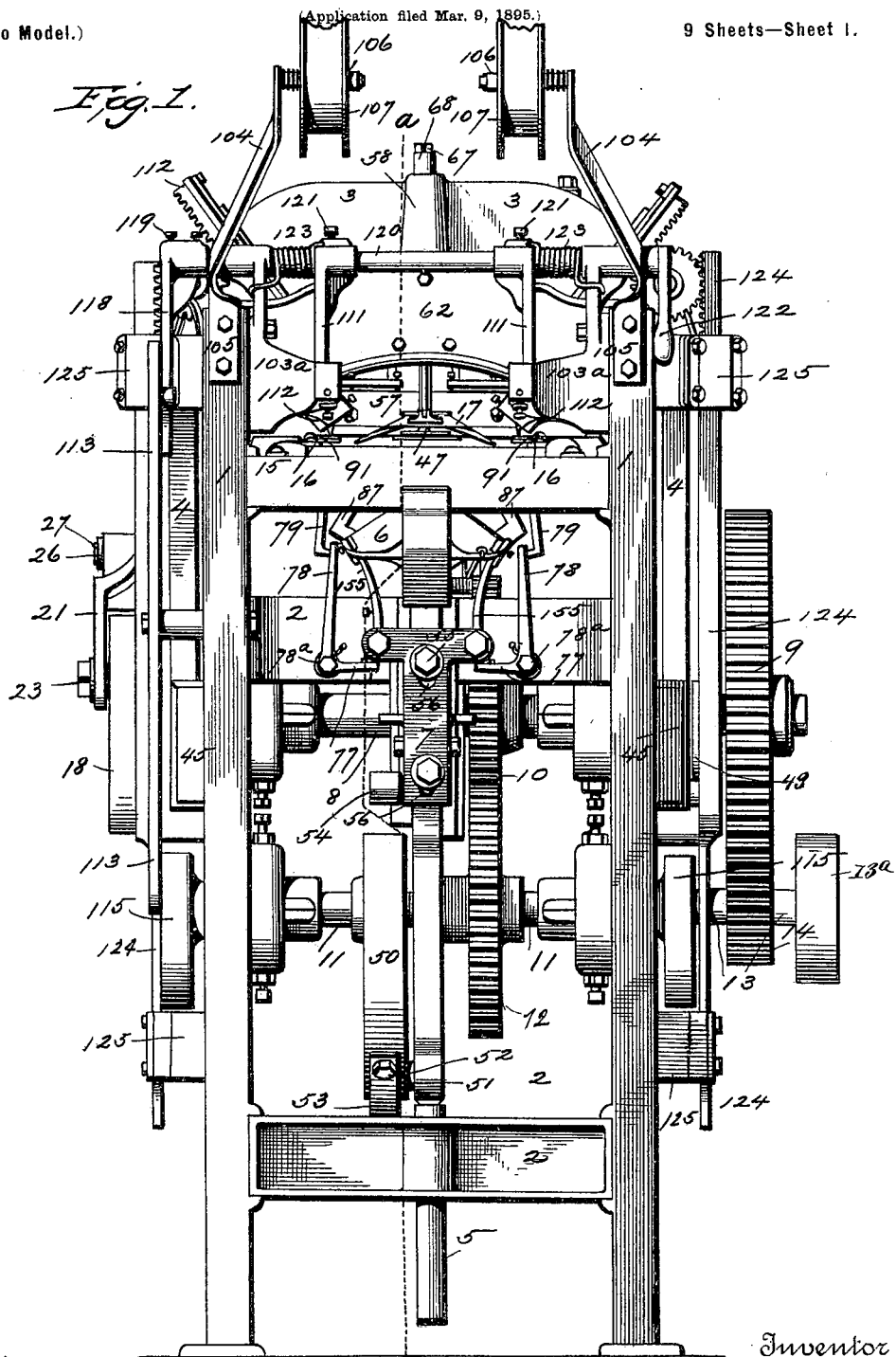

No. 621,215. Patented Mar. 14, 1899.
N. E. BROWN.
MACHINE FOR MANUFACTURING DISHES OR TRAYS.
(Application filed Mar. 9, 1895.)
(No Model.) 9 Sheets—Sheet 1.

Fig. I.

Witnesses
Inventor
Norman E. Brown
By Chas. J. Gooch
Attorney

No. 621,215. Patented Mar. 14, 1899.
N. E. BROWN.
MACHINE FOR MANUFACTURING DISHES OR TRAYS.
(Application filed Mar. 9, 1895.)
(No Model.) 9 Sheets—Sheet 2.

Fig. 2

Witnesses.
Clarence E. Mehlhope
Edward J. Haat.

Inventor,
Norman E. Brown,
By Arthur Stem,
Attorney.

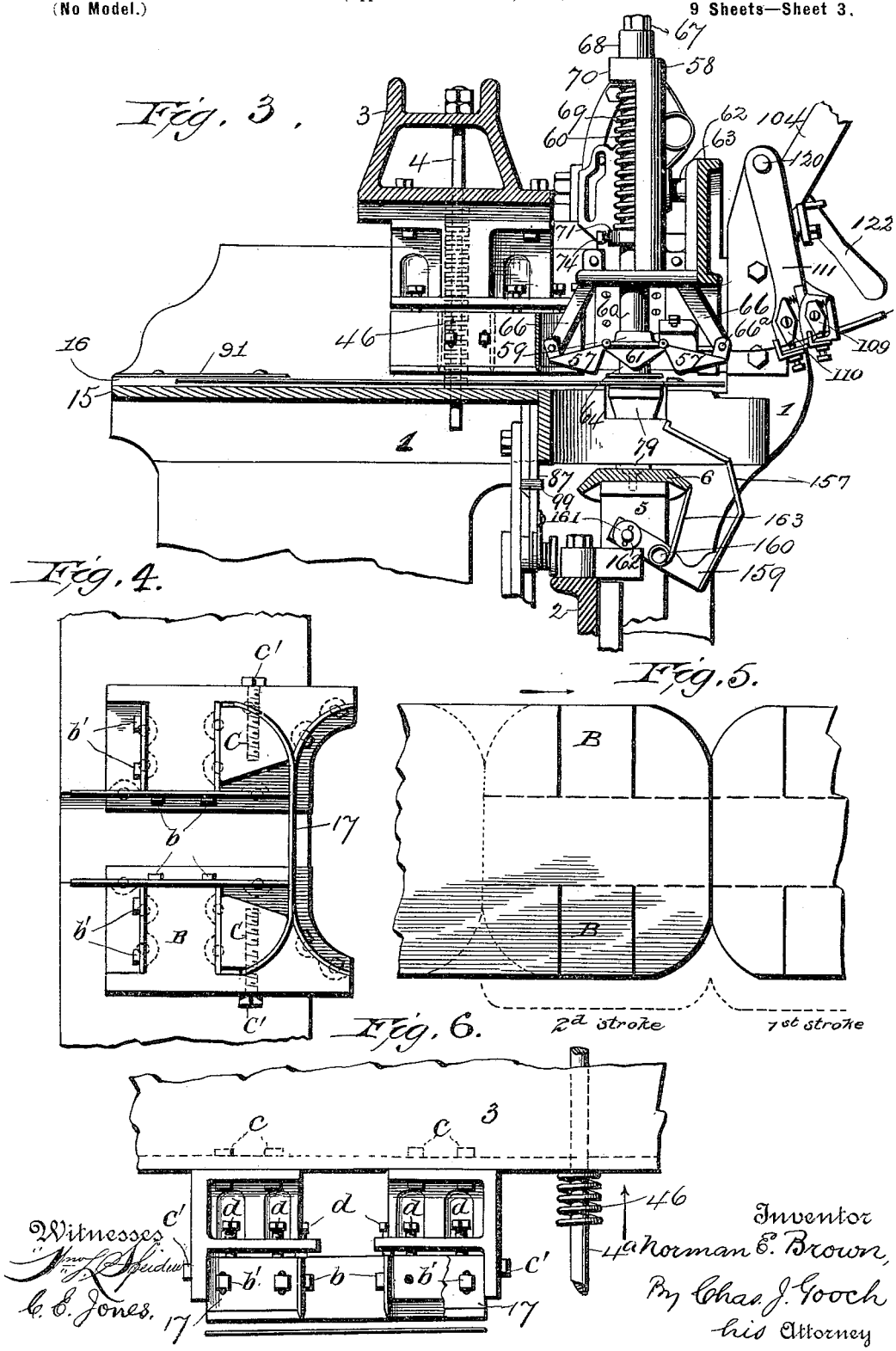

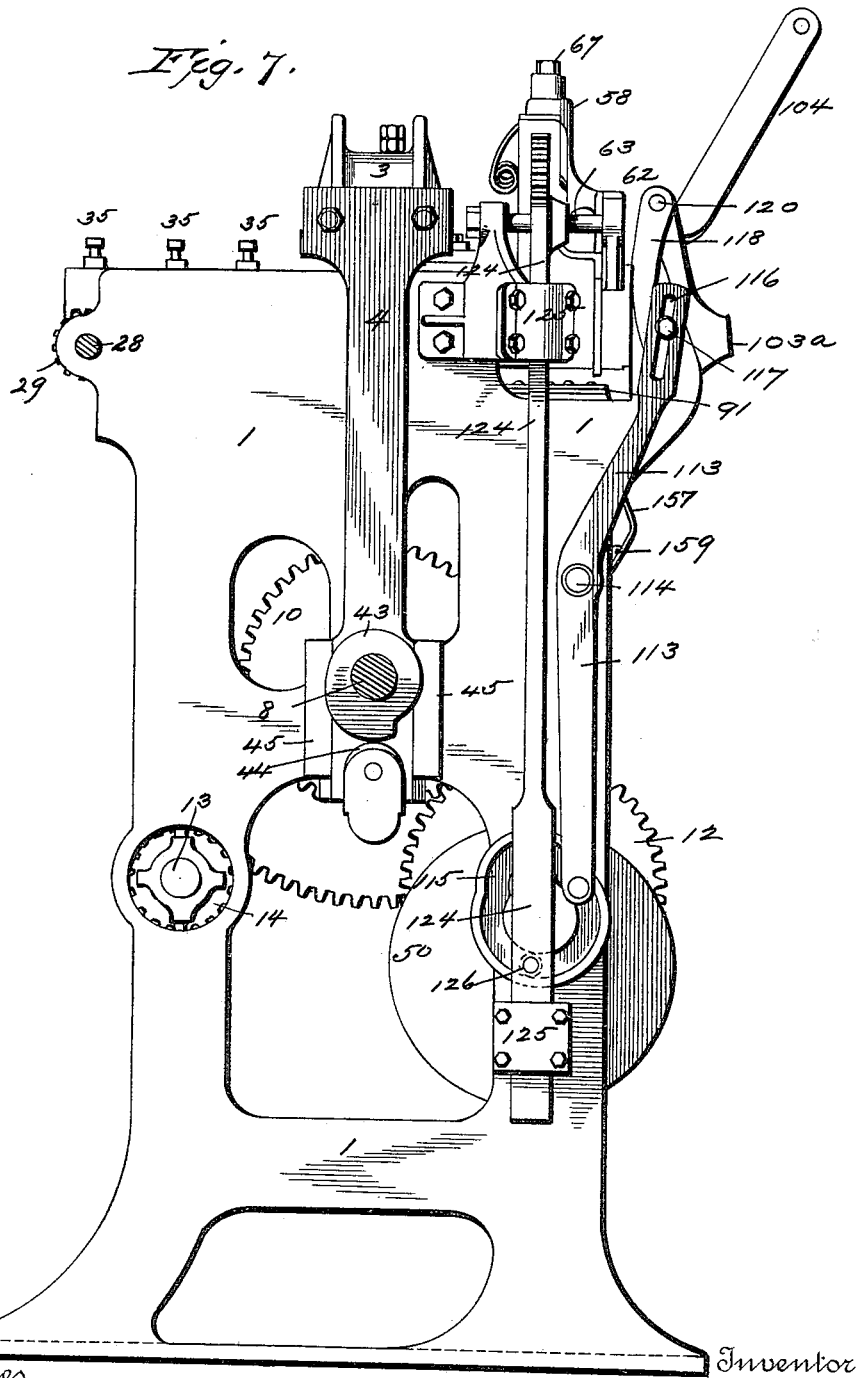

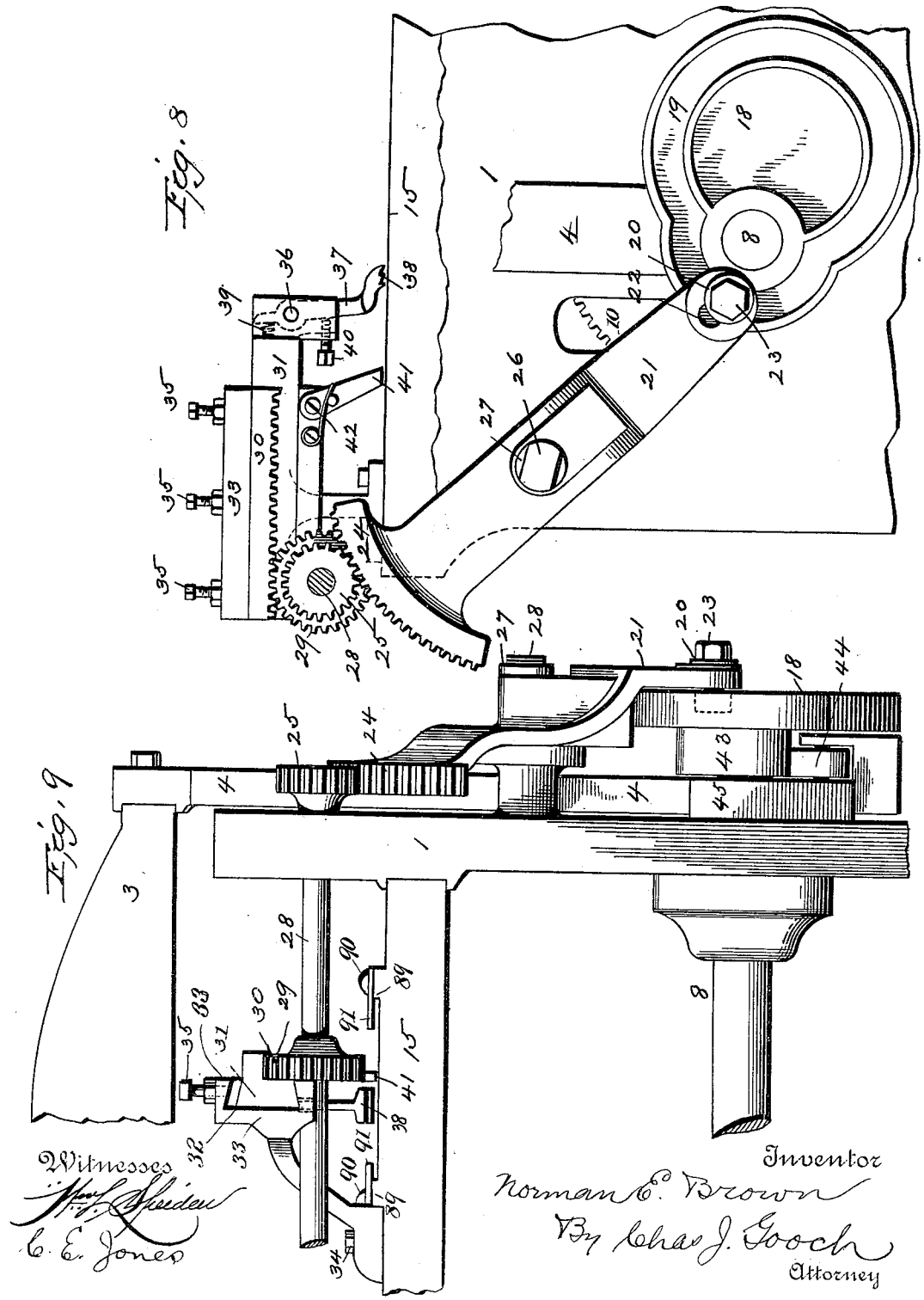

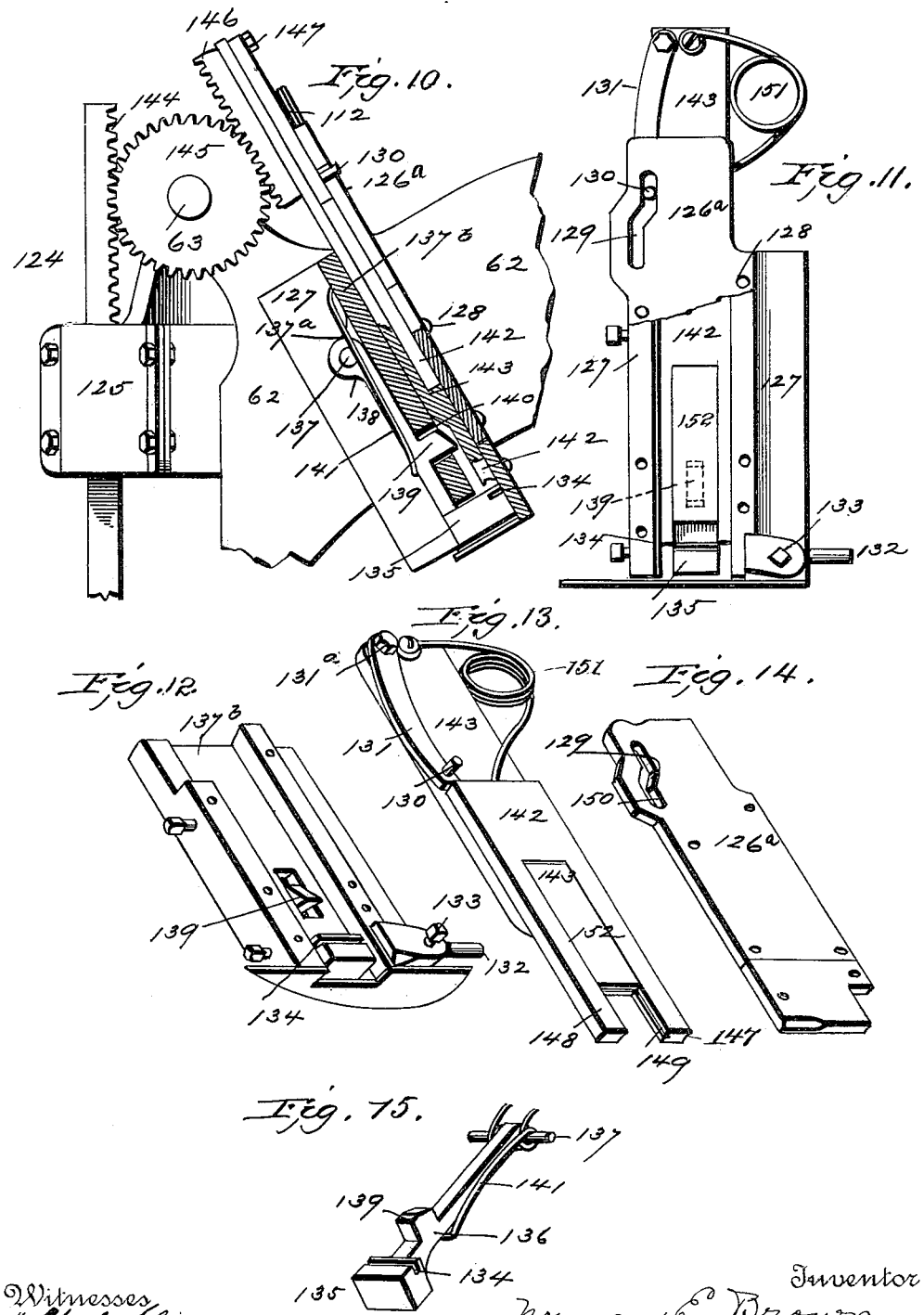

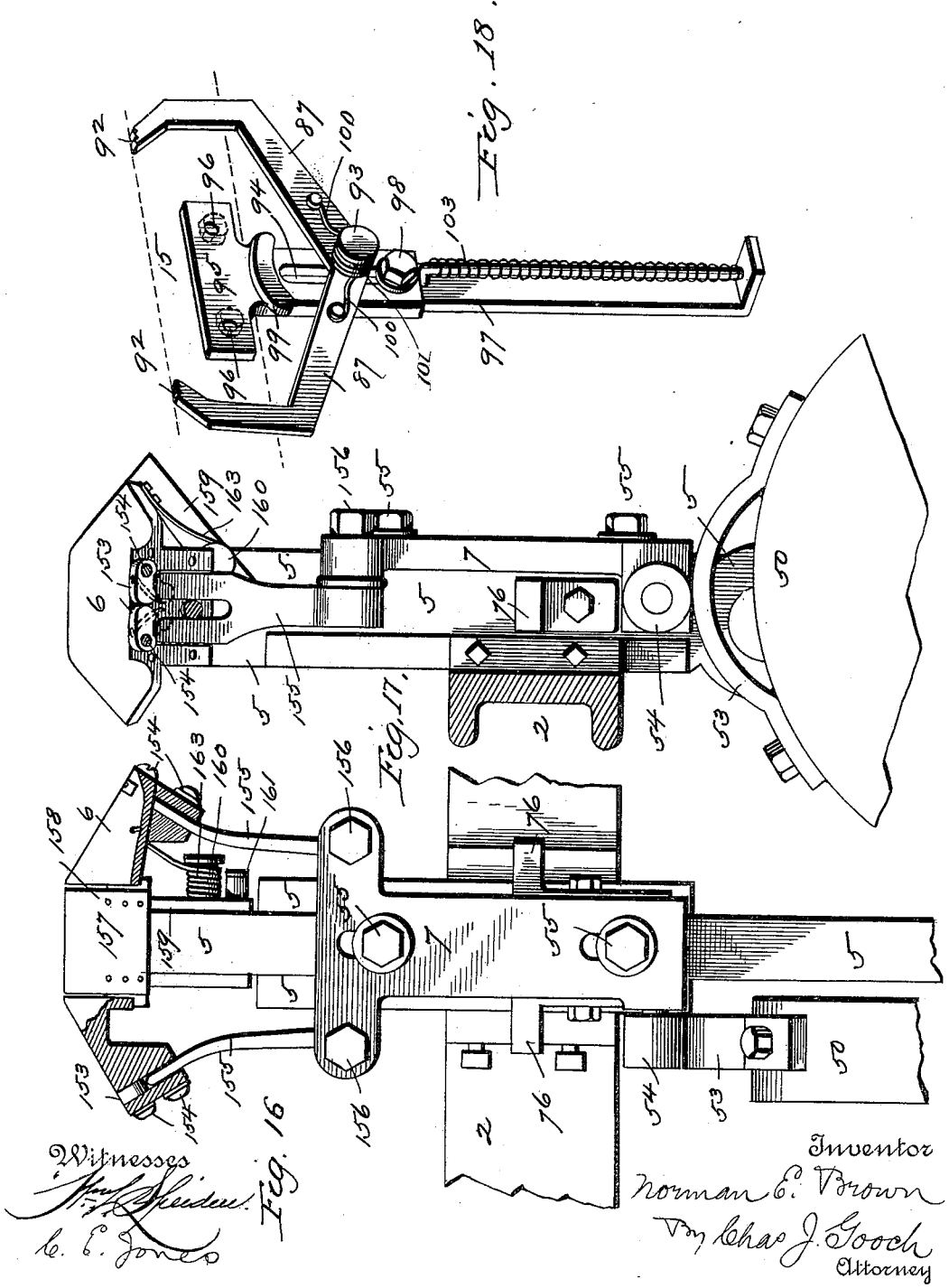

No. 621,215. Patented Mar. 14, 1899.
N. E. BROWN.
MACHINE FOR MANUFACTURING DISHES OR TRAYS.
(Application filed Mar. 9, 1895.)
(No Model.) 9 Sheets—Sheet 8.
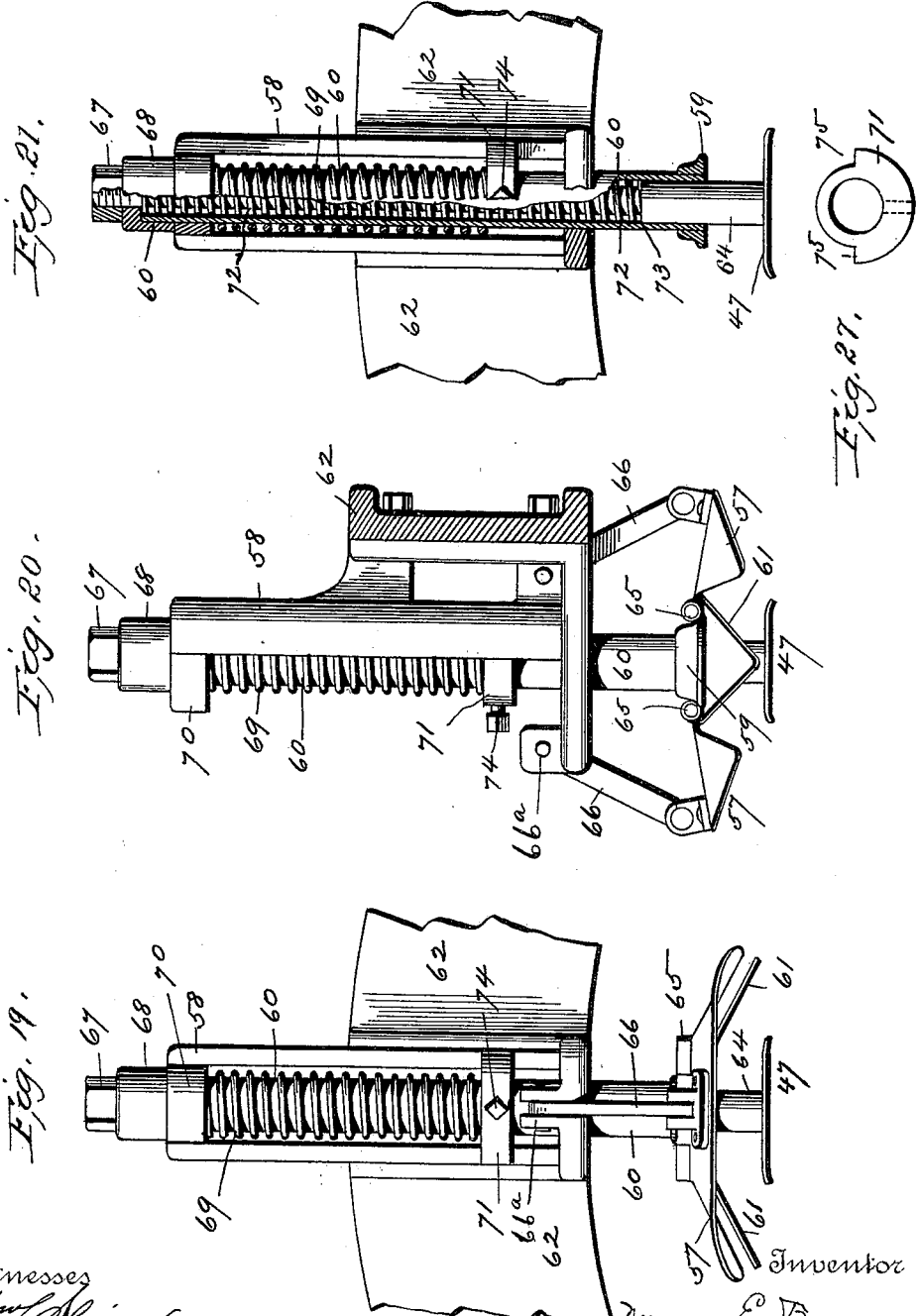

No. 621,215. Patented Mar. 14, 1899.
N. E. BROWN.
MACHINE FOR MANUFACTURING DISHES OR TRAYS.
(Application filed Mar. 9, 1895.)
(No Model.) 9 Sheets—Sheet 9.
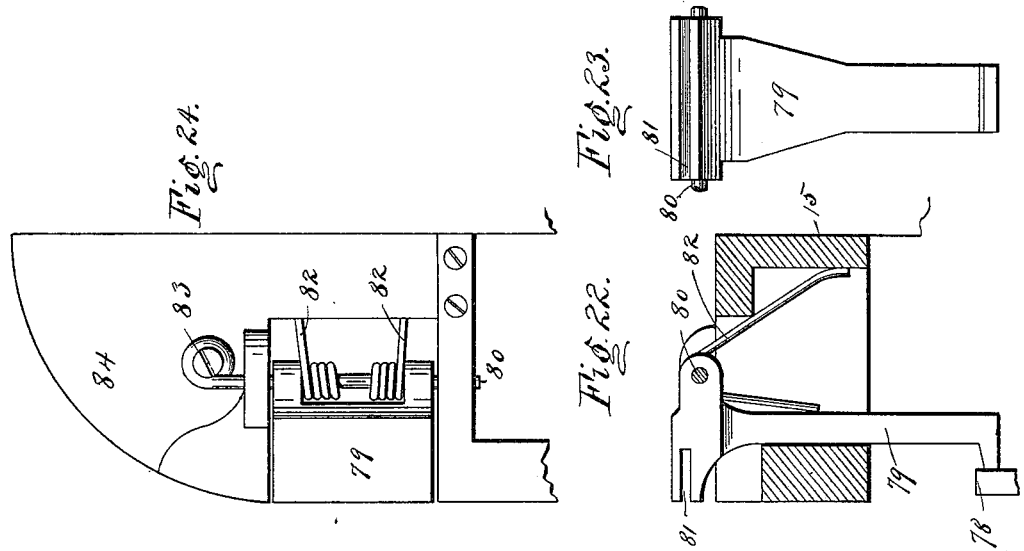
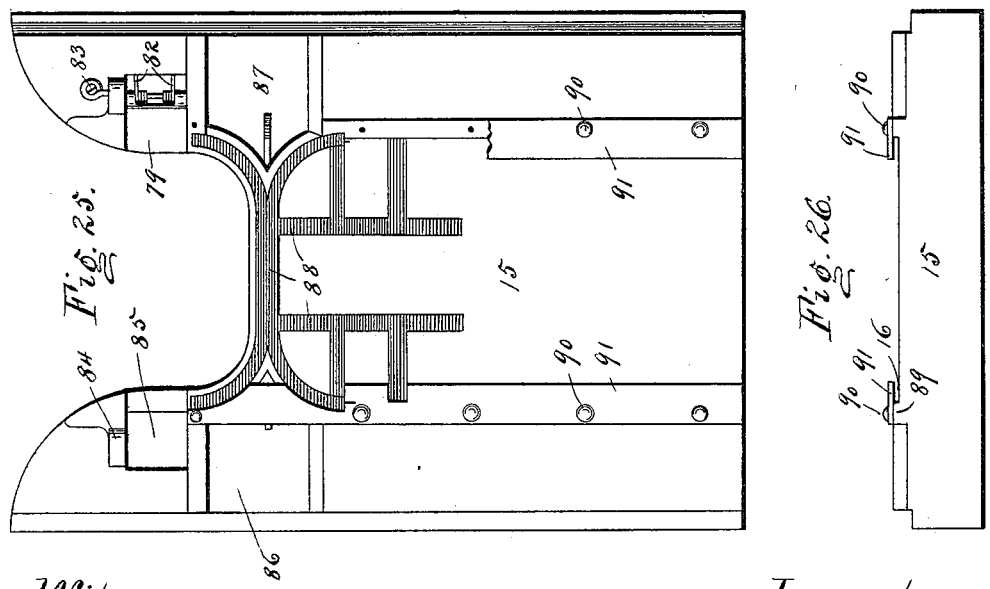
Witnesses. Inventor.
Norman E. Brown,
By Arthur Stem,
Attorney.

UNITED STATES PATENT OFFICE.

NORMAN E. BROWN, OF ST. JOSEPH, MICHIGAN, ASSIGNOR TO THE AMERICAN MERCANTILE COMPANY, OF DAYTON, OHIO.

MACHINE FOR MANUFACTURING DISHES OR TRAYS.

SPECIFICATION forming part of Letters Patent No. 621,215, dated March 14, 1899.

Application filed March 9, 1895. Serial No. 541,204. (No model.)

*To all whom it may concern:*

Be it known that I, NORMAN E. BROWN, a citizen of the United States, residing at St. Joseph, in the county of Berrien and State of Michigan, have invented a certain new and useful Machine for Manufacturing Dishes or Trays from Veneer-Wood; and I do hereby declare the following to be a full, clear, and exact description of the invention, such as will enable others skilled in the art to which it appertains to make and use the same.

This invention relates, as hereinafter described, to a new and improved machine for manufacturing dishes or trays from veneer-wood.

The invention consists, as will hereinafter appear, in improved mechanism for feeding and cutting lengths of and bending or forming strips of veneer into dish or tray shape, stapling and discharging the formed dishes or trays, and in other details whereby finished and completed dishes or trays for holding butter, fruits, or other articles are formed in a single machine by a continuous operation directly from strips of veneer or thin wood. The machine comprises in a single unitary structure, in combination with special mechanism for actuating the same, mechanism by which the strips of veneer are intermittently fed the appropriate distance along and guided on a table, cutting-knives which cut from said strips blanks, vertically-reciprocating devices for shaping or forming and bending the blanks into dish shape, mechanism for removing the waste pieces of veneer, wire-feed mechanism, mechanism for wiring or stapling the dishes, and mechanism for discharging the completed dishes. As constructed and arranged the several parts for feeding the veneer and finally turning out complete dishes operate automatically in continuity of movement, so that each step of the process follows the other without delay or necessitating action on the part of the operatives after the machine is started, except to simply place the strips of veneer on the guide-table.

In the accompanying drawings are illustrated views of the complete mechanism viewed from different positions and detail views, drawn to a larger scale, of individual parts thereof.

Figure 1 represents a front elevation. Fig. 2 is a cross-section of the entire machine, showing my improvement, taken on the line *a a* of Fig. 1, the folding mechanism above the former, however, being shown in full. Fig. 3 represents a sectional view on the line *a a* of Fig. 1 of the upper portion of the machine with the feed mechanism omitted and showing the folder in full; Fig. 4, an under plan view, on an enlarged scale, of the stock-cutting die; Fig. 5, a detail plan view of the dish-forming stock as it appears under successive operations thereon, as indicated. Fig. 6 represents an enlarged detail side elevation of the stock-cutting dies and a portion of the cross-head and a cross-head-returning rod. Fig. 7 represents a side elevation with part of the gears omitted for clearness of view of the complete machine. Fig. 8 represents a side elevation, and Fig. 9 is a front sectional view of a portion of my machine, showing the feed mechanism. Figs. 10 to 15, inclusive, represent detail views, on an enlarged scale, of the stapling mechanism whereby the formed dishes or trays are wired or stapled. Fig. 16 represents a front elevation, and Fig. 17 a side elevation, of the former upon which the dish is made and its connecting and operating mechanism. Fig. 18 represents a detail perspective view of the device for removing the waste pieces of stock from the machine. Fig. 19 represents a rear elevation of the folder and operating mechanism by which the veneer blank is placed on the former and formed in readiness for stapling. Fig. 20 represents a side elevation thereof, and Fig. 21 represents a rear sectional elevation of said folder with parts omitted. Fig. 22 represents a sectional elevation, Fig. 23 a face view, and Fig. 24 a plan view, illustrative of the devices for grasping and bending down the material in readiness for the operation thereon of the folder. Figs. 25 and 26 represent plan and edge views of the table or bed-piece on which the stock is guided to the cutting-knives and cut. Fig. 27 is a plan of a spring-retaining collar.

1 represents the main frame of the machine;

2, cross-ties or braces thereof; 3, the cross-beam, carrying the knives by which the blanks are cut from the strips of veneer. 4 represents connecting-rods carrying said knife-carrying cross-beam.

5 represents the plunger, carrying and actuating the dish-former 6 and the slide-bar 7.

8 represents the main driving-shaft, which is located centrally of the machine and has mounted thereon near one end a toothed gear-wheel 9 and centrally a gear-wheel 10.

11 represents an auxiliary driving-shaft located below and forwardly of and parallel with the main driving-shaft 8 and having thereon a toothed gear 12, which meshes with the gear 10 on the shaft 8, a second auxiliary shaft 13 being journaled in the frame 1 parallel with but rearwardly of the shaft 11, having mounted thereon a pinion 14, which meshes with the outer gear 9 on the shaft 8, this shaft 13 being provided with a pulley 13ª to receive a belt from the engine or motor by which it is driven and imparting motion to the main shaft 8 by reason of the meshing of the pinion 14 on the shaft 13 with the pinion 9 on the shaft 8. These shafts 8, 11, and 13 constitute, with the gears already mentioned, connected driving-shafts, on which are carried the various cams and slides or connecting-rods, to be presently described, by which the several parts of the operative mechanism are actuated.

15 represents the bed-plate or table, with plates 91 forming guideways 16, in which the stock from which the dishes are to be formed is fed to the knives 17 for cutting the stock to the proper size and shape, the cutting of the stock being done on this table or bed-piece. The knives 17 are bolted at $b\,b$ and $b'\,b'$ to a casting B, which is bolted at $c\,c$ to the cross-head 3.

C C are blocks set into a hollow portion of the casting B. The knives 17 are set between the casting B and blocks C C, as seen in Fig. 4. The blocks C C are held in place by set or wedge screws or bolts $c'\,c'$, the wedge-screws $c'$ passing through the casting B into the blocks C C, thereby wedging the knives in place at these points. The bolts $b\,b$ and $b'\,b'$ pass through slots in the knives 17, thus permitting of their proper adjustment for any wear to which they are subject. In order to assist and hold the knives in the position desired and prevent their being pressed upward, I provide set-screws $d$.

The stock having been placed on the bed-plate or table 15 with its edges within the grooves or ways 16 thereon, it is automatically fed first to the knives 17, by which it is cut to the appropriate size from which to form the dish. The size and shape of these knives and of the dish-forming and other mechanism hereinafter described may of course be varied according to the size and shape of the dishes to be produced.

The feed mechanism for feeding dish-forming stock to the cutting-knives and dish-former is operated from the main driving-shaft 8, and consists of a cam 18, mounted on said main driving-shaft 8 and having a circumferential and eccentric groove 19, within which a roller 20 on the lower end of an arm 21 travels, said roller being shown as held in place by bolt and nut 23, or it may be done in any other suitable manner. 26 represents the pivot-bearing of arm 21 on the frame 1. This roller 20, traveling in the eccentric groove 19 of cam 18, gives an oscillatory movement to the arm 21, which arm has at its upper end a toothed segment 24, which meshes with the small pinion 25 on the transverse shaft 28, which shaft is also provided with toothed gear 29, this gear 29 meshing with the toothed rack 30 on the sliding arm 31, the sliding arm 31 being slidably seated within a groove or recess in a block 33. The block 33, as here shown, has a curved rear portion, which is bolted at 34 to the top of the table or bed-plate 15, along which bed-plate the stock is fed to the knives 17.

35 are set-screws for holding a gib to take up the slack of the arm 31. As the arm 21 is oscillated by means of the cam 18 and roller 20 rotary movement is imparted through the medium of the toothed segment 24 and cog 25 to the shaft 28 and gear 29, which latter, engaging with the toothed rack 30, causes the reciprocation back and forth in the block 33 of the stock-feeding arm 31, forwardly to feed the stock to the knives and rearwardly for another feed. In a block in the forward end of the arm 31 is pivoted at 36 a spring-held feed-foot 37, having a serrated under face 38, the spring 39, pressing against the horn at the upper end of said foot, operating to maintain the lower portion of said foot in operative position and to hold the serrated bottom portion down to contact with the stock.

40 represents a set-screw which is passed through the block on the front end of the arm or slide 31 and serves as a stop to prevent the excessive rearward movement of the stock-gripping and feed foot 37. Secured to the block 33 is a depending foot 41, which is held down to operative position by a spring 42, as shown. This foot 41 serves to grip the stock and hold it in position when the slide-arm 31 and feed-foot 37 are drawn back for the purpose of permitting said feed-foot obtaining another grip rearwardly for another feed of the stock. The toothed segment is of a size and the arm 21 is of such length and adjustment as, in connection with the grooved cam, to insure the slide-arm 31 and feed-foot 37 sliding forward just sufficiently to feed the necessary quantity of stock to form a single dish at each forward movement. The rotation of the drive-shaft 8, rotating to actuate said cam 18 and the thereto-connected mechanism to insure the feed of the stock to the knives 17, also causes the rotation of a pair of cams 43, located on said main shaft 8. These cams 43 contact with rollers 44, journaled on the lower ends of the connecting-rods 4, and on their eccentric portions coming in contact with said rollers 44 operate to force down said connecting-rods and consequently the thereto-connected knife-carrying cross-beam 3, and thus draw down the knives 17 upon the stock to cut it to the requisite size.

45 represents guideways in which the connecting-rods 4 slide in their reciprocal movements, and 46 represents springs by which said rods 4ª and stock-cutting mechanism are automatically raised as the eccentric portion of the cams 43 passes out of contact with the rollers 44.

The blank having been cut, the next operation is to form or shape the same. This is accomplished by former and folding mechanism which I will now proceed to describe.

6 represents the form on which the dishes or trays are shaped and wired or stapled. This form or former 6 is at its top bolted, as at 48, to the plunger 5, which latter has vertical reciprocal bearing in sockets in the cross-ties 2 and has a vertical slot 49 to afford guide-bearing thereto in its reciprocal movements.

50 represents a cam located on the shaft 11 and in which works a roller 51, mounted on a stud 52 in the plunger 5. The rotation of this cam 50, operating on the roller 51, carried by the form carrying and operating plunger 5, operates to raise the said former 6 against the under face of the dish-blank and, assisting to bend or fold the same to shape, force it against the bending or folding mechanism to be presently described.

53 represents a loop bolted or otherwise secured to the cam 50 and which as said cam rotates operates against a roller 54, connected with the sliding bar 7, which latter is slidably connected to the plunger 5 by means of bolts 55, passed through vertical slots 56 in said slide-bar. As the former 6, which, as shown, is approximately of the shape of a formed dish, rises it first presses the stock against the presser-foot 47, which is carried on the lower end of rod 64, the rod 64 sliding into sleeve 60 and being under the pressure of spring 72, which holds the stock momentarily while it is being cut and detached from the stock and succeeding blank formed. The former then continues its upward movement, carrying with it said presser-foot 47, until the latter comes in contact with a collar 59 on the sleeve 60. The former then bends and presses the blank against the wings 57 of the folding device 58, which is located immediately above the vertical path of the former 6 and is bolted to the frame 62, this frame 62 also carrying one end of the shafts 63. Of the dish-forming wings those marked 57 are hinged at 65 to the collar 59, while those marked 61, against which the center lap of the dish is held, are rigidly secured thereto. As the rod 64 and sleeve 60 are carried up the link arms or rods 66, pivoted in ears 66ª, operate to hold the outer portion of the hinged wings 57 down, so as to press the blank closely against the form 6 while the formed dish is being wired or stapled.

67 represents a stop-nut to prevent the rod 64 going down too far.

68 is a nut surrounding the sleeve 65 and which, striking against the frame 58, serves as a stop to limit the downward movement of the sleeve 60.

69 represents a spiral spring for holding down the sleeve 60. This spring at its upper end impinges against the offset 70 of the frame 58 of the folding device, its lower end impinging against a collar 71.

72 is a spiral spring which encircles the rod 64, located within the sleeve 60, and has end bearing, respectively, on a shoulder 73 on said rod and within the nut 68 for the purpose of holding said rod 64 in position. The collar 71, which is secured to the sleeve 60 by a set-screw 74, is provided with shoulders 75, which rest against the frame 58 and prevent the turning of the sleeve 60.

76 represents lugs on the plunger 5, which as said plunger rises strike the lower members 77 of the angle-arms 78, which are pivoted on studs 78ª, the upper members of which arms then strike and push outward the lower ends of the pair of arms 79, which are hinged at 80, one on each side of the machine, said arms 79 being provided with grooved heads 81, the grooves of which are in the same horizontal plane as the surface of the bed-plate and in the path of the dish-forming blank, and the groove of said heads constituting a continuation of the grooves or ways at the sides of the bed-plate, within which the edges of the blank slide. By the angle-arms 78 striking the lower ends of the arms 79 and pressing them outward the grooved heads 81 are thereby tilted downward toward each other before the dish-forming dies contact, bending down with them the central portion B of the cut blank, which form the ends of the dish, thus giving a preliminary bend or crease to the blank at this point previous to the action of the dies. By this mechanism it will thus be seen that the central end portions B of the blank will always be on the inside of the dish, while the corner end portions will overlap the central end portions on the outside of the dish, thus always insuring uniformity in construction of the dish.

82 represents retracting-springs which encircle the pivot-pins 80 and serve to draw back to position the arms 79 after operation, so as to allow the lugs 76 on the descent of the plunger 5 to pass without moving the arms 79.

83 represents a screw by which the pivot-pin 80 is held in place; 84, the raised portions of the bed-piece or table 15, in which the arms 79 are pivoted; 85, recesses in said table, in which said arms oscillate; 86, openings in which the waste-removing arms 87 operate and through which waste pieces are removed from the machine.

88 represents grooves filled with Babbitt metal, upon which the knives 17 cut the veneer. The function of the arms 78 and 79 is to secure the gripping of the end of the central part of the dish-blank and bend it down, so that when the folder has operated on the blank the side pieces of the dish-blank may be bent or folded outside of the central piece. This is readily accomplished, as the edges of the blank enter the grooves in the heads of the arms 79, the tilting of the said grooved heads, as above explained, bending the central end pieces of the dish-blank over.

On reference to Fig. 26 the mode in which the stock-guiding ways 16 are formed will be readily apparent. While any other known means may be followed, I have, as shown, designed the table or bed-piece with upwardly-extending ribs or projections 89, to which by screws 90 are secured inwardly-extending plates 91, the spaces between such extended portions of said plates and the table constituting said ways 16.

As the stock is cut by the knives waste pieces are produced which must be removed. This it is the function of the arms 87 to accomplish. These waste-removing angle-arms 87 have serrated upper ends 92 and have pivotal or hinged support on a stud 93, which is passed through a slot 94 in a plate 95, bolted at 96 to the side of the table or bed-piece 15, the rear end of said stud 93 being fastened to a strap or plate 97, which is slidably secured to said plate 95 by a bolt 98, passed through said slot 94. As the plunger 5 rises, a lug 102 thereon strikes the plate 97 and said plate 97 and the thereto-attached stud 93 are thereby raised, thereby forcing the serrated upper ends 92 of the arms 87 against the waste pieces of stock, which are held from upward movement by the plates 91. As the arms 87 rise their lower portions impinge against the lug 99, which causes them to spread or open out laterally, and thereby draw away and discharge the waste pieces of stock gripped by the serrations 92. As the plunger 5 again descends the arms 100 of a spring 101, attached to the arms 87 and coiled around the stud 93, draw said waste-removing arms 87 inward for another operation, and as the pressure of the lug 102 against the bottom of the plate 97 is released the spring 103, which is coiled around a rod attached to the bottom of plate 95 and slides through an opening in the bottom or foot of plate 97, as seen in Fig. 2, thus holding spring 103 in place, the tendency of which spring 103 is to retract said plate 97 down again to its lowest position in readiness for another upward movement. The dish having thus been formed and the waste pieces of stock removed, the next step, the formed dish being still held in formed position on the form, is to wire or staple the dish. This is accomplished by means of reels of wire supported above the machine, wire-feeds 103ª, and their connected mechanism now to be described.

104 represents a pair of upwardly-extending arms bolted at their lower ends, as at 105, to the frame 1 and having at their upper portions inwardly-extending spindles 106, on which a pair of wire-reels 107 are journaled. From these reels the wires for stapling the dishes pass to and through flexible tubes 108, which are inserted in the depending wire-feed plates 103ª, which also are provided on the sides with a wire-grasping dog 109, this plate 103ª having shaft 120 pass through its upper portion, as seen in Fig. 1. The wire is held against the bottom of the dog 109 by the set-screw, the object of the dog 109 being to hold the wire, while the arm 111, which is back of the depending plate 103ª and which is provided with dog 110, swings forward (toward the plate 103ª) to secure a new hold on the wire for another feed, the dog 110 being so arranged in combination with its set-screw (see Figs. 2 and 3) that when the arm 111 swings toward the machine (the swing being regulated to the amount of wire necessary to be fed) the dog 110 and its set-screw wedge the wire between them and grip it tightly and draw it toward the machine and to the stapling devices 112, which are located on opposite sides of the machine, as clearly shown in Figs. 1 and 3.

113 represents an arm or lever, Figs. 1 and 7, pivoted on the frame 1 at 114 and operated by means of a pin at the lower end of arm 113 entering the groove 115 in the cam carried by the shaft 11. The upper ends of the arm or lever 113 are provided with a vertical slot 116, passing through which is a pin or bolt 117, slidably connecting an arm 118, which in turn is clamped at 119 to the shaft 120. As the arm 113 is oscillated by the cam 115 the arm 118 and shaft 120 are rocked, thereby rocking the arms 111, clamped to said shaft 120 by clamp-screws 121, just far enough to draw sufficient wire through the dogs or clutches 109 to form the staple.

122 represents a lever or handle by which the shaft may be returned to position, and 123 represents springs encircling said shaft, the operation of which is to assist the return of said shaft and hold it in position.

In Figs. 10 to 15, inclusive, are shown detail views of the stapling devices 112, of which there are two exactly alike, one on each side of the machine, as shown in Fig. 1, each being bolted on the plate 62 and operated by the connecting-rods 124, which reciprocate in ways 125 on the frame 1 and are actuated by the cams 115 engaging rollers 126 on the lower portions of said connecting-rods 124. Each stapling device being alike, as well as the mechanism located on opposite sides of the machine for actuating the same, it will of course be sufficient to describe one thereof to enable those skilled in this art to understand the same, the duality of said parts being readily understood and on reference to the drawings readily apparent.

126ª represents the face-plate of the shell or frame 127 of the stapler, within which shell or frame the working parts of the stapling mechanism are contained and operate. This plate 126ª is removably secured to the shell or frame by screws 128 to admit of ready access to the staple forming and driving mechanism contained therein and has an angular or bayonet shaped slot 129, which operates as a guide for the pin 130 on the lower end of the arm 131, which latter, at its lower edge, rests against the upper edge of the staple bending or forming slide 142 to secure the movement downward of said slide in unison with the staple-driver 143. The wire is fed through the flexible tubes 108 to and through tubes 132, each of which is secured within a slot in the shell 127 by a set-screw 133 into and partly through a transverse slot 134 in the head-block 135 of the rocking bar 136, which is rockingly journaled on a pin 137, having bearing in the ear 137ª of a plate 137ᵇ, said ear being located within a recess 138 in the rear of the shell or frame 127. This wire-receiving bar 136 is provided on its front face with an outwardly-projecting lug 139, which normally extends through a slot 140 in the plate 137ᵇ, said bar 136 and lug 139 being held in projected position by a spring 141, which I have shown in two forms in Fig. 10, as a flat spring whose ends press against the back of plate 137ᵇ and against bar 136 and passing over the pin 137, thus holding it in place and leaving it to exert its tension upward against the bar 136, while in Fig. 15 I have shown the spring 141 as encircling the pin 137, but acting in the same manner as the form just described, the bar 136 in both cases being yieldingly held outward.

142 represents the slide by which the length of the wire held by the head-block 135 is cut and bent to form the staple. This slide 142 and the staple-driver 143 are connected by a spring 151, which at its lower end is attached to the slide 142 and at its upper end to the staple-driver 143, as shown in Fig. 11.

143 represents the staple-driver. The connecting-rods 124 are each provided on its upper end with a series of cogs or teeth 144, which mesh with a toothed gear 145, journaled on the shaft 63, said gear in turn meshing with a toothed rack 146, bolted at 147 to the staple-driver 143. At the proper moment, which is gaged by the gears, the cams 115 on the shaft 11 operate upon the rollers 126 on the lower portions of said rods 124 and cause said rods to rise. As said rods rise the toothed upper ends 144 thereof rotate the toothed gears 145 in a forward direction, which gears in turn draw down the racks 146, connected with the staple-drivers 143. As said drivers descend they carry with them the thereto-connected wire bending and cutting slides 142. As these slides 142 descend upon the lengths of wire fed through the tubes 132 into the groove 134 in the respective head-blocks the cutting-points 147 at the bottom of the slides 142 cut the wire to the desired lengths and, continuing to descend, bend those portions of the cut lengths of wire extending laterally of the head-blocks 135 over and down against the sides of said head-blocks and into the vertical grooves 149 in the inner side walls of the slides 142.

The means by which the wire-bending slides are operated is as follows: The arms 131, pivoted to the staple-drivers at 131ª and impinging at their lower ends on the upper edges of the respective slides 142, cause said slides 142 to move down in unison with the staple-driving slides 143 for a sufficient distance to accomplish the bending into staple form of the wire held by said head-blocks 145. The plate 126, which is stationarily attached to the shells 127, (which also remains stationary during the descent of the slides 143,) is provided with a bayonet-shaped slot 129, into which pins 130 on the arms 131 take. As these slides 142 and 143 (on which 131 is attached at 131ª) move downward the pin 130 slides down in the slot 129 of plate 126, during the first part of which descent the two plates 142 and 143 of course move together by reason of the contact of arm 131 with the plate 142, as shown in Figs. 11 and 13. Then as the pin continues it of course is forced to follow the slot 129, and by reason of the slot taking a side and outward course the arms 131 are of course pulled or forced to the side, and thus disconnected from plate 142, and the slide or driver 143 is permitted to continue on its downward course independently, the plate 142 being held in position by springs 151, the purpose of which springs 151 is also to throw the plate 142 down far enough on the slide 143 when it returns to its normal position to again permit arm 131 to return to operative position, as shown in Fig. 13. The continued upward movement of the connecting-rods 124, through the medium of the toothed gearing already described, causes the continued descent of the staple-drivers 143, whose lower ends are provided each with an offset 152, which is guided in its reciprocal movements within the slotted lower end of the wire cutting and bending slide 142, as shown in Fig. 11. As the staple-drivers descend they strike against lugs 139, and thereby force the lower portion of the bars 136 rearwardly, and thus draw the head-blocks away from the formed staples, the staple-drivers 143 then impinging on and forcing the staples into and connecting the lapping portions of the veneer dish. The descent of the connecting-rods 124 raises, through the medium of the racks 144 and 146 and gears 145, the staple formers and drivers for another operation.

In Figs. 16 and 17 are shown in detail the staple-clenching mechanism. 153 represents the anvils on which the legs of the staples are clenched. These anvils are pivoted at 154 in recesses formed in the dish-former and are operated by the arms 155, which are hinged at 156 to the sliding bar 7, the upward movement of which bar is secured by means of the cam 50 and loop 53, operating against the roller 54. Immediately on the staples being driven into the dish the slide 7 moves up and forces the arms 155 up against the dependent or loose ends of the anvils 153, thereby raising and pressing the anvils against the staple-legs so as to bend and clench them.

The dish having thus been formed and stapled its discharge from the machine in completed condition is effected by a discharge or throw-off plate or finger 157, which is of corresponding angular shape, as shown, to the shape of the dish and is secured at 158 to the arm 159, which is journaled on a stud 160 and has on its lower or inner end a roller 161, which, coming in contact on the downward movement of the plunger 5 with a lug 162, which is bolted on top of cross-beam 2, causes the plate or finger 157 to tip forward and throw the finished dish off the form 6. As the plunger 5 again ascends the pressure against the roller 161 is released, whereupon the spring 163, attached to the arm 159 and bearing against the plunger, retracts and returns the dish-discharging finger 157 to position in readiness for another throw, this finger being received in a recess in the top of the plunger, as shown in Fig. 16.

Any suitable source of power may be connected with the main driving-shaft 8.

The mode of operation of this machine will, it is believed, be readily understood by those skilled in this art from an inspection of the drawings and description thereof above given. While the complete machine comprises numerous individual parts, said parts are not excessive, and, as will be readily seen, they each act in unison the one with the other in the order of operation of the several devices going to produce a complete dish directly from a strip of veneer. As the machine is started up the main driving-shaft, through the medium of the eccentric cam 18, arm 21, slide 31, feet 37 and 41, segment and gearing connecting parts, as more clearly shown in Figs. 8 and 9, operates to feed the strips of veneer to the cutting-knives 17. As soon as the feed is accomplished the shaft has turned the eccentric cams 43 to a position to operate on the rollers 44 on the slides 4, which carry and reciprocate the knife-carrying cross-bar 3, so as to bring the presser-foot 47 on the stock and also bring the knives down to cut the stock. The waste-removing arms or fingers are then operated, as herein described, by the upward movement of the plunger 5, which is actuated through the medium of the gears 10 12, shaft 11, and cam 50 to draw away and discharge the waste pieces of stock. The devices by means of which the cut blank is formed or shaped into dish form, consisting of the form 6, on which the blank rests and is held by the presser-foot, the slide 7, actuated by means of the loop 53 on the cam 50, and roller 54, shaft 11, and connecting-gear, the fingers 78 and 79, and wings 57 and 61, are then brought into operation as the shaft 8 rotates through the medium of the gears connecting the two shafts and the cam mechanism described, so as to bend the sides and overlap and bend down the ends of the blank into dish form. The continued upward movement of the slide 7 then raises the anvil-operating arms 155 and the thereto-connected anvils 153 acting against the under face of the formed dish in readiness to receive and clench the legs of the staples. The connecting-rods 124 are then, through the medium of the cams 115 on the shaft 11 and rollers 126, carried by said connecting-rods, raised, and, through the medium of toothed gearing on said rods 124 and connecting said rods with the stapling mechanism, (shown in Figs. 10 to 15, inclusive,) the forming and inserting and clenching of the staples in the formed dish thereby accomplished. The dish having thus been formed and stapled the plunger 5 begins its downward movement, and as it descends it causes the roller 161, connected with the discharge-finger 157 to strike against a lug 162, and thereby tip said finger 157, as shown in Fig. 2, so as to throw off the completed dish.

The operation of the machine in its several parts is continuous, the several parts and the gearing connecting and operating the same being so gaged as to bring each successively-operating part into operation at the appropriate time, as will be readily understood.

Having thus described my invention, what I claim, and desire to secure by Letters Patent, is—

1. In a dish-former, the combination with a shaft and means for actuating the same, a blank-folder supported on a frame having a plurality of hinged folding-wings, a dish-form carried by a plunger which is provided at its opposite end with a roller, said dish-form provided with staple-clenching anvils, a slide-bar slidably connected to the plunger, and a pair of bifurcated anvil-engaging arms pivoted to said slide-bar, cam having a loop secured thereto located on said shaft, a roller journaled on the plunger and engaging with said cam, and roller on said slide-bar to be operated on by the loop on said cam, substantially as and for the purpose described.

2. In a dish-former, the combination with means arranged in the path of the dish-forming blank whereby the central end portions of the blank are bent inside of the overlapping corner end portions, of a pair of dish-forming dies one of which is yieldingly supported in a frame, hinged folding-wings carried by one of said dies, and arms extending from the frame and secured to said wings.

3. In a dish-former, the combination with means arranged in the path of the dish-forming blank whereby the central end portions of the blank are bent inside of the overlapping corner end portions, of a pair of dish-forming dies one of which is yieldingly supported in a frame, hinged folding-wings carried by one of said dies, arms extending from the frame and secured to said wings, and a yieldingly-supported spring presser-foot.

4. Mechanism for forming veneer dishes and the like, consisting of vertically-reciprocating plunger and slide and means as described for actuating the same, a dish-form mounted on said plunger and provided with staple-clenching anvils, a blank-folder supported on a frame and having a plurality of vertically-operating hinged wings located above the dish-form, pivoted arms adapted to hold said wings in downwardly-projected position upon the dish-form, and arms pivoted to said slide and arranged to contact with and control the staple-clenching anvils, substantially as and for the purpose set forth.

5. In a machine for making dishes or trays, the combination of a plunger supporting a dish-form and mechanism for actuating said plunger, blank-gripping arms pivoted on the frame of the machine, and spring-held arms pivoted to the frame and adapted to engage and rock said blank-gripping arms, with lugs integral with said plunger and adapted to engage with the spring-held pivotal arms whereby the spring-held pivotal arms and blank-gripping arms are rocked, substantially as and for the purpose set forth.

6. A blank bender and folder, consisting of a form or support for the blank, a presser-foot for holding said blank thereon, vertically-reciprocating device provided with wings arranged to fold or bend the sides of the blank over upon the form, a vertically-reciprocating plunger supporting said form, said plunger provided with lugs, pivotal arms arranged to be engaged by said lugs, gripping-arms pivoted to the frame and in contact with said pivotal arms, and means substantially as described for actuating the plunger and dish-forming mechanism, substantially as and for the purpose set forth.

7. In a dish-forming machine, the combination of feed mechanism for feeding the blanks, a bed having guideways and openings at the ends of such guideways, a blank-cutter, a waste-discharge, consisting of a vertically-slotted support, a slide, means as described for vertically reciprocating said slide, angle-arms having pivotal bearing on said slide and having their upper ends arranged to project through such openings in the bed, a stop-lug in the vertical path of said angle-arms to distend said arms, and means for returning said arms to their normal or contracted position, substantially as and for the purpose set forth.

8. In a waste-discharge, consisting of a bed-piece or table having stock-guiding ways, the combination with a plate secured to said table and having vertically-slotted depending portion with a transverse lug, a slide having vertically-slidable connection with said plate, said slide-plate provided with a stud having vertical slide-bearing in said slotted plate and provided with a pair of inwardly-extending angle-arms, said arms having pivotal bearing on said stud, means for retracting said slide-plate and stud and the angle-arms, of mechanism intermediate the main driving-shaft and said waste-discharge for actuating said slide-plate and arms, substantially as and for the purpose set forth.

9. A staple former and driver, consisting of rigidly-mounted shell or casing having a face-plate provided with a bayonet-slot therein, staple forming and driving slides arranged to act conjointly to a predetermined point, an arm pivoted to the staple-driver slide and arranged to operate the staple-former, a pin carried by such arm and projecting in said bayonet-slot, and a spring-controlled staple-retainer, said staple-driving slide provided with a toothed rack meshing with gearing, mechanism intermediate a drive-shaft and said gearing whereby the gearing is rotated and the slides actuated, in combination with wire-feeding mechanism arranged to feed a predetermined amount of wire to said staple-forming slide, substantially as and for the purpose set forth.

10. In a staple forming and driving mechanism, the combination of a shell or casing having a face-plate having a bayonet-slot therein, staple forming and driving slides, an arm pivoted to the staple-driver and arranged to operate the staple-former, a pin carried by such arm and projecting in said bayonet-slot, and a spring-controlled staple-retainer having a lug arranged to contact with the staple-driving slide whereby said retainer is depressed out of the path of the slides and forced to release the staple, said staple-driving slide provided with a toothed rack meshing with gearing, mechanism intermediate a drive-shaft and said gearing whereby the gearing is rotated and the slides actuated, with means for returning the slides to their relative positions, substantially as and for the purpose set forth.

11. In a dish-former, a female die yieldingly supported in the frame, a male die, and a plunger carrying the same, staple-forming mechanism, anvils pivoted in said male die, a slide connected to said plunger, and vertically-extending arms pivoted to said slide and arranged to operate said anvils, substantially as set forth.

12. In a dish-forming machine, the combination with a pair of dies, of means arranged in the path of the dish-forming blank in advance of the dies, whereby the central end portions of the dish-forming blank are bent inside of the overlapping corner end portions, substantially as set forth.

13. In a dish-forming machine, the combination with a pair of dies, of a pair of arms pivotally arranged in the path of the dish-forming blank, and means for tilting said arms, whereby the central end portions of the dish-forming blank are bent inside of the overlapping corner end portions, during the reciprocation of the die, substantially as shown and in the manner specified.

14. In a dish-forming machine, the combination with a pair of dies, one of which is mounted on a vertically-reciprocating plunger, of a pair of oscillating arms having grooved heads in the path of the dish-forming blank, and mechanism intermediate said die-carrying plunger and arms, whereby they are oscillated and the central end portions of the blank bent down and inside of the dish, at predetermined intervals, during the reciprocation of the die-carrying plunger, substantially as shown and in the manner specified.

15. A staple former and driver, consisting of rigidly-mounted shell or casing having a face-plate provided with a bayonet-slot therein, staple forming and driving slides arranged to act conjointly to a predetermined point, an arm pivoted to the staple-driver slide and arranged to operate the staple-former, a pin or roller carried by such arm and projecting in said bayonet-slot, whereby the conjoint action of the slides is discontinued, and staple-retaining block, mechanism intermediate a drive-shaft and said staple-driving slide, in combination with wire-feeding mechanism arranged to feed a predetermined amount of wire to said retaining-block, substantially as and for the purpose set forth.

In testimony whereof I affix my signature in presence of two witnesses.

NORMAN E. BROWN.

Witnesses:
LAWRENCE C. FYFE,
GEORGE P. PULLEN.